United States Patent [19]

Hiraoka et al.

[11] Patent Number: 4,974,852

[45] Date of Patent: Dec. 4, 1990

[54] ONE-PIECE SOLID GOLF BALL

[75] Inventors: Hidenori Hiraoka; Katsutoshi Kitaoh, both of Kobe; Kiyoto Maruoka, Nishinomiya; Mikio Yamada, Kobe, all of Japan

[73] Assignee: Sumitomo Rubber Industries, Ltd., Kyogo, Japan

[21] Appl. No.: 456,529

[22] Filed: Dec. 26, 1989

[30] Foreign Application Priority Data

Dec. 28, 1988 [JP] Japan .................. 63-332562

[51] Int. Cl.$^5$ ................ A63B 37/14; A63B 37/00
[52] U.S. Cl. ................. 273/218; 260/998.14; 524/908
[58] Field of Search ............ 273/218; 524/908; 260/998.14

[56] References Cited

U.S. PATENT DOCUMENTS

| | | | |
|---|---|---|---|
| 4,266,772 | 5/1981 | Martin et al. | 273/218 |
| 4,656,269 | 11/1977 | Pollitt et al. | 260/998.14 |
| 4,665,877 | 8/1979 | Miller et al. | 260/998.14 |
| 4,852,884 | 8/1989 | Sullivan | 524/197 |

*Primary Examiner*—Allan M. Lieberman

*Attorney, Agent, or Firm*—Birch, Stewart, Kolasch & Birch

[57] ABSTRACT

A one-piece golf ball exhibiting an increased flying distance and a high durability suitable for golf driving ranges, i.e. a solid golf ball having a central hardness (JIS-C hardness) of 60 to 75, a hardness at a position 10 mm from the center of 72 to 80 and a surface hardness of 70 to 85, whereby the central hardness is minimum, and the difference between the maximum hardness and the minimum hardness is 15 or less, said golf ball being obtained by vulcanizing and molding a rubber composition comprising (a) 100 parts by weight of polybutadiene rubber, mainly comprising high-cis-polybutadiene rubber containing the cis-1,4-structure in a quantity of at least 96% and having a Mooney viscosity of 48 to 85 synthesized by the use of a nickel-containing catalyst;

(b) 0.1 to 2.0 parts by weight of 2,5-di-t-butylhydroquinone as a vulcanization stabilizer;

(c) 10 to 50 parts by weight of unsaturated carboxylic acids and/or salts thereof; and (d) 0.5 to 5 parts by weight of a free radical initiator.

7 Claims, No Drawings ated by the use of a nickel-containing catalysts is used. The Mooney's viscosity is an elastomeric viscosity which is measured by the Mooney shear disc viscosimeter. In the present invention, the Mooney's viscosity is 48 to 85, preferably 55 to 65. If the Mooney's viscosity is less than 48, the golf ball is insufficient its rebound property. On the contrary, if the Mooney's viscosity is too high, the workability, such as kneadability and moldability, is remarkably reduced, whereby the quality of the obtained golf ball is spoiled rather than improved. Polybutadiene rubber contains a cis-1,4-structure in a quantity of 96% or more. If the cis-1,4-structure is contained in a quantity less than 96%, a disadvantage occurs in the reduction of its rebound elasticity, and the like.

ONE-PIECE SOLID GOLF BALL

FIELD OF THE INVENTION

The present invention relates to a one-piece solid golf ball.

BACKGROUND OF THE INVENTION

A golf ball, which is generally used in golf driving ranges, is superior in durability but insufficient in flying distance. In particular, where the space for golf driving ranges is limited, such as in certain large cities, a ball which is insufficient in flying distance by highly durable, has been preferred to a ball superior in flying distance.

However, recently developed fields and unused places of businesses have been utilized for golf driving ranges, whereby the number of considerably large driving ranges has been increased. Thus, a golf ball which exhibits increased flying distance, similar to the flying distance of golf balls typically used in a round of golf, has been required.

In compliance with this requirement, if it is intended to obtain a one-piece solid golf ball exhibiting an increased flying distance (that is a high rebound elasticity), it is necessary to obtain a golf ball in which the center is soft and the outside is hard. Such a golf ball is generally poor in durability and it is unsuitable for practical use pm golf driving ranges.

SUMMARY OF THE INVENTION

The present invention provides a golf ball exhibiting an increased flying distance and a high durability suitable for golf driving ranges, i.e. a one-piece solid golf ball having a central hardness (JIS-C hardness) of 60 to 75, a hardness at a position of 10 mm from the center of 72 to 80 and a surface hardness of 70 to 85, with the central hardness being the minimum amount, and with the difference between the maximum hardness and the minimum hardness being 15 or less. The golf ball is obtained by vulcanizing and molding a rubber composition comprising
 (a) 100 parts by weight of polybutadiene rubber mainly comprising high-cis-polybutadiene rubber containing cis-1,4-structure in a quantity of at least 96% and having a Mooney viscosity of 48 to 85 and synthesized by the use of a nickel-containing catalysts;
 (b) 0.1 to 2.0 parts by weight of 2,5-di-t-butylhydroquinone as a vulcanization stabilizer;
 (c) 10 to 50 parts by weight of unsaturated carboxylic acids and/or salts thereof; and
 (d) 0.5 to 5 parts by weight of a free radical initiator.

The golf ball can be used as a typical ball for normal play.

DETAILED DESCRIPTION OF THE INVENTION

The golf ball according to the present invention is obtained from a rubber composition mainly comprising high-cis-polybutadiene rubber. High-cis-polybutadiene rubber is produced by the use of various kinds of catalyst (for example nickel-containing catalysts, titanium-containing catalysts, cobalt-containing catalysts and the like) and it is different to some extent in its properties depending upon the kind of catalyst which is utilized. According to the present invention, in particular, high-cis-polybutadiene rubber containing a cis-1,4-structure in a quantity of at least 96% and having a Mooney's viscosity of 48 to 85 obtained by the use of a nickel-containing catalysts is used.

Other rubber ingredients may be added in addition to the above described high-cis-polybutadiene rubber. The rubber ingredients, which can be added, include BR-150L (UBE INDUSTRIES, LTD.), BR-CB22 (Bayer), BR-11 (JAPAN SYNTHETIC RUBBER CO., LTD.) BR-CB10 (Bayer), BR-T520 (JAPAN SYNTHETIC RUBBER CO., LTD.), BR-CB23 (Bayer) and the like. The other rubber ingredients can be added in a quantity of 0 to 50 parts by weight based on 100 parts by weight of all rubber compounds.

To the rubber composition of the present invention, 2,5-di-t-butylhydroquinone is added in a quantity of 0.1 to 2.0 parts by weight, preferably 0.15 to 0.5 parts by weight, based on 100 parts by weight of the high-cis-polybutadiene rubber. This compound is added as a vulcanization stabilizer and serves to suppress a runaway reaction and delay the vulcanization. Thus, the hardness distribution according to the present invention is brought about. If this compound is added in a quantity of less than 0.1 parts, the action as a stabilizer is insufficient. In addition, if this compound is added in a quantity of more than 2.0 parts by weight, the action is too strong and thus the vulcanization is hindered.

Unsaturated carboxylic acids and/or salts thereof are added as vulcanizing agents to the rubber composition of the present invention. Although various kinds of carboxylic acids having unsaturated bounds are used as the unsaturated carboxylic acids, $\alpha,\beta$-unsaturated carboxylic acids, for example acrylic acid, methacrylic acid, maleic acid and the like, are preferably used. Salts of the unsaturated carboxylic acids, for example magnesium salts, zinc salts and the like, may also be used. These vulcanizing agents are added in a quantity of 10 to 50 parts by weight, preferably 15 to 30 parts by weight, based on 100 parts of the high-cis-polybutadiene rubber. If the vulcanizing agents are added in a quantity of less than 10 parts by weight, the crosslinking is insufficient and thus sufficient hardness and rebounding cannot be obtained. If they are added in a quantity exceeding 50 parts by weight, the ball becomes too hard.

The free radical initiator added to the rubber composition includes dicumyl peroxide, t-butylperoxybenzoate, t-butylcumyl peroxide, 1,1-bis(t-butylperoxy)-3,3,5-trimethylcyclohexane and the like. The quantity of the initiator added is not especially limited but if it is used in a quantity of 0.5 to 5.0 parts by weight based on 100 parts by weight of the high-cis-polybutadiene rubber, the golf ball, which is superior in hardness and durability, can be obtained.

The rubber composition may contain other additives, for example antioxidants, fillers and the like. Preferred antioxidants includes 4,4'-thiobis(6-t-butyl-3-methylphenol) and the like. Examples of the fillers are zinc oxide, calcium carbonate and the like.

The golf ball according to the present invention is obtained by vulcanizing the rubber composition obtained by kneading the above described ingredients by a conventional method. Usually, the rubber composition is pressed in a molding die to be vulcanized. The vulcanizing conditions may be optionally selected but the vulcanization is conducted in one to several steps, preferably 1 to 3 steps. Giving an example of a two step process, in a first step the vulcanization is conducted for 18 to 35 minutes at 150° to 165° C. and then for 5 to 15 minutes at 165° C. to 175° C. The vulcanizing temperature is controlled within the range of 150° to 180° C., preferably 155° to 175° C., in either vulcanization in single step or vulcanization in a plurality of steps.

The one-piece golf ball according to the present invention has a specified distribution of hardness. Concretely speaking, the central hardness is 60 to 75, preferably 64 to 72, and the hardness at the distance of 10 mm from the center is 72 to 80. The surface hardness is 70 to 85, preferably 72 to 80. In addition, the central hardness is the minimum value of the distribution of hardness and the difference between the minimum hardness and the maximum hardness should be 15 or less, preferably 10 or less. If the hardness is less than the claimed range, the ball is too soft and thus both the flying distance and the durability are reduced. On the contrary, if the hardness is larger than the claimed range, the ball is too hard and thus the feeling is inferior. In addition, if the central hardness is not the minimum hardness, even though the hardness itself is suitable, the feeling is inferior when the ball is struck by the golf club of a golfer. Furthermore, if the difference between the minimum hardness and the maximum hardness is more than 15 points, the durability of the ball is reduced. The hardness is determined by dividing the ball into two pieces and measuring the hardness of the center, a point at distance of 10 mm from the center and the surface (that is to say, measuring from on the surface) by means of a rubber-hardness tester (the spring type hardness tester of JIS-C type manufactured by Kobunshi Keiki Co., Ltd.). This distribution of hardness can be easily achieved by formulating 2,5-di-t-butylhydroquinone into the rubber composition as the vulcanization stabilizer, In particular, in the case where the vulcanization is conducted within the above described temperature range, the distribution of hardness would be more improved.

The one-piece solid golf ball according to the present invention exhibits the superior durability required for golf balls used in driving ranges while at the same time travelling a distance closer to that of a ball used for normal golf play.

EXAMPLE

The present invention will be illustrated by the following examples which, however, are not to be construed as limiting the present invention.

Example 1, 2 and Comparative Examples 1 to 5

Rubber compositions prepared as shown in Table 1 were vulcanized in a ball-molding metallic mold under pressure and at the conditions shown in Table 1 to produce one-piece solid golf balls having a diameter of 42.8 mm.

The obtained golf balls were tested on ball-compression, coefficient of restitution, distribution of hardness and flying distance with the results shown in Table 1. In addition, parts of the respective materials shown in Table 1 are represented by weight. Furthermore, methods of measuring ball-compression, coefficient of restitution, durability, distribution of hardness and flying distance are as follows:

Ball-Compression (Compression strength of the ball)

A reciprocal of a quantity of the ball deformation from a point in time when an initial load of 10 Kg was applied until a point in time when a final load of 130 Kg was applied was indicated by a number based on 100 for Comparative example 1.

Coefficient of Restitution

The coefficient of restitution when the ball was struck by a shock cylinder at a speed of 45 m/s was indicated by a number based on 100 for Comparative Example 1.

Distribution of Hardness

The ball was divided in two parts and the hardness at the center, at a point at the distance of 5 mm from the center, at a point 10 mm from the center, a point 15 mm from the center and at the surface of the ball was measured by means of a rubber-hardness tester (the spring type hardness tester of JIS-c type manufactured by Kobunshi Keiki Co., Ltd.) in compliance with JIS K 6301.

Flying Distance

The flying distance when the ball was struck by a wooden #1 club at 45 m/s by means of a swing robot, and when the ball was struck by a iron #5 club at 38 m/s by means of a swing robot was indicated by a number based on 0 for Comparative example 1.

Durability

The golf ball was continuously given the same shock (i.e. the ball was driven against an iron flat plate at a speed of 45 m/s) and the number of times the shock was produced until the ball was broken was indicated. The larger the value, the more superior the durability.

TABLE 1

|  |  | Example No. | | Comparative Example No. | | | | |
|---|---|---|---|---|---|---|---|---|
|  |  | 1 | 2 | 1 | 2 | 3 | 4 | 5 |
| Composition | High-cis-polybutadiene rubber A*1 | 100 | 100 | — | — | — | 100 | 100 |
|  | High-cis-polybutadiene rubber B*2 | — | — | 100 | — | — | — | — |
|  | High-cis-polybutadiene rubber C*3 | — | — | — | 100 | — | — | — |
|  | High-cis-polybutadiene rubber D*4 | — | — | — | — | 100 | — | — |
|  | Zinc oxide | 23 | 23 | 23 | 23 | 23 | 23 | 23 |
|  | Methacrylic acid | 24 | 24 | 24 | 24 | 24 | 24 | 24 |
|  | Vulcanization stabilizer*5 | 0.2 | 0.2 | 0.2 | 0.2 | 0.2 | — | — |
|  | Initiator*6 | A1.6 | B1.6 | A1.0 | A0.8 | A0.8 | A1.4 | A1.3 |

TABLE 1-continued

|  |  | Example No. |  | Comparative Example No. |  |  |  |  |
|---|---|---|---|---|---|---|---|---|
|  |  | 1 | 2 | 1 | 2 | 3 | 4 | 5 |
| Vulcanization | Temperature (°C.) × Time (min) | 165 × 20 | 160 × 22.5 170 × 5 | 170 × 20 | 168 × 20 | 165 × 20 | 165 × 20 | 165 × 20 |
| Property | Compression | 98 | 98 | 100 | 100 | 99 | 102 | 96 |
|  | Coefficient of restitution | 1.02 | 1.03 | 1.00 | 0.87 | 0.98 | 0.93 | 0.92 |
|  | Durability | 105 | 103 | 100 | 102 | 89 | 78 | 74 |
|  | Hardness Center | 66.0 | 70.0 | 68.0 | 64.5 | 66.4 | 63.2 | 58 |
|  | (JIS-C) 5 mm | 67.5 | 76.5 | 71.0 | 70.0 | 70.2 | 68.5 | 64.5 |
|  | 10 mm | 74.0 | 78.5 | 77.3 | 73.0 | 73.4 | 75.2 | 68.2 |
|  | 15 mm | 76.0 | 78.0 | 78.0 | 75.0 | 75.5 | 80.3 | 71.3 |
|  | Surface | 76.0 | 78.0 | 78.5 | 76.2 | 76.6 | 86.3 | 77.1 |
|  | Flying distance at W1, 45 m/s | +5 | +5 | 0 | −3 | −1 | −1 | −2 |
|  | Flying distance at I5, 38 m/s | +3 | +2 | 0 | −3 | −1 | −2 | −2 |

*[1] High-cis-polybutadiene rubber (Ni-containing catalysts) (manufactured by JAPAN SYNTHETIC RUBBER CO., LTD. by way of trial) having the Mooney's viscosity $ML_{1+4}$ [100° C.] of 60 to 65.
*[2] High-cis-polybutadiene rubber BR11 (Ni-containing catalysts) (manufactured by JAPAN SYNTHETIC RUBBER CO., LTD.) having the Mooney's viscosity $ML_{1+4}$ [100° C.] of 38 to 42.
*[3] High-cis-polybutadiene rubber BR200 (Co-containing catalysts) (manufactured by UBE INDUSTRIES, LTD.) having the Mooney's viscosity $ML_{1+4}$ [100° C.] of 38 to 44.
*[4] High-cis-polybutadiene rubber Europrene HCIS (Nd-containing catalysts) (manufactured by Enichem) having the Mooney's viscosity of 43.
*[5] 2,5-di-t-butylhydroquinone NOCRAC NS-7 (manufactured by OUCHI SHINKO CHEMICAL INDUSTRIAL).
*[6] A: dicumyl peroxide.
B: 1,1-bis(t-butylperoxide)-3,3,5-trimethylcyclohexane.

In Example 1 high-cis-polybutadiene rubber having a Mooney viscosity of 60 to 65 is used but in Comparative Example 1 high-cis-polybutadiene rubber having a Mooney viscosity of 38 to 42 is used. In this case, the distribution of hardness is within the scope of the present invention in both Example 1 and Comparative Example 1 but the former is superior to the latter in durability and flying distance.

The catalyst used in the synthesis of high-cis-polybutadiene rubber used in Example 1 is nickel, cobalt in Comparative Example 2, and neodymium in Comparative Example 3. The Mooney's viscosity of high-cis-polybutadiene rubber B is 38 to 42, that of high-cis-polybutadiene rubber C being 38 to 44, and that of high-cis-polybutadiene D being 43. It is found from a comparison of high-cis-polybutadiene rubber D with high-cis-polybutadiene rubber B that the Mooney's viscosity is almost the same but the latter is superior to the former in flying distance. The predominance of the nickel-containing catalysts can be explained by this but it has been found that of the high-cis-polybutadiene rubber synthesized by the use of nickel-containing catalysts, high-cis-polybutadiene rubber having a specified Mooney's viscosity is most desirable.

In both Comparative Example 4 and Comparative Example 5, 2,5-di-t-butylhydroquinone is not used. In the former the surface hardness is outside of the scope according to the present invention while in the latter the central hardness is outside of the scope according to the present invention. Example 1, 2 are superior to Comparative Example 1 to 5 in flying distance and durability.

Example 3 to 5 and Comparative Examples 6 to 9

Golf ball were produced under the conditions shown in Table 2 and evaluated in the same manner as in Example 1 and 2. The results are shown in Table 2.

TABLE 2

|  |  | Example No. |  | Comparative Example No. |  |  |  |  |
|---|---|---|---|---|---|---|---|---|
|  |  | 3 | 4 | 5 | 6 | 7 | 8 | 9 |
| Composition | High-cis-polybutadiene rubber A | 100 | 50 | 50 | 30 | 30 | — | — |
|  | High-cis-polybutadiene rubber E*[1] | — | 50 | — | 70 | — | 100 | — |
|  | High-cis-polybutadiene rubber F*[2] | — | — | 50 | — | 70 | — | 100 |
|  | Zinc oxide | 23 | 23 | 23 | 23 | 23 | 23 | 23 |
|  | Methacrylic acid | 24 | 24 | 24 | 24 | 24 | 24 | 24 |
|  | Vulcanization stabilizer*[3] | 0.2 | 0.2 | 0.2 | 0.2 | 0.2 | 0.2 | 0.2 |
|  | Initiator*[4] | 1.6 | 1.45 | 1.65 | 1.65 | 1.65 | 1.1 | 1.7 |
| Vulcanization | Temperature (°C.) × Time (min) | 160 × 25 + 170 × 5 | 163 × 24 + 173 × 5 | 163 × 24 + 173 × 5 | 165 × 24 + 175 × 5 | 165 × 24 + 175 × 5 | 160 × 29 + 170 × 5 | 160 × 25 + 170 × 5 |
| Property | Compression | 98 | 98 | 99 | 98 | 99 | 99 | 98 |
|  | Coefficient of restitution | 1.00 | 1.00 | 1.00 | 0.96 | 0.97 | 0.96 | 0.97 |
|  | Durability | 100 | 101 | 102 | 96 | 96 | 95 | 90 |
|  | Hardness Center | 72 | 68 | 70 | 66 | 71 | 76 | 73 |
|  | (JIS-C) 5 mm | 74 | 71 | 74 | 69 | 74 | 77 | 76 |
|  | 10 m | 76 | 75 | 75 | 74 | 75 | 76 | 78 |
|  | 15 mm | 77 | 75 | 76 | 74 | 76 | 74 | 78 |
|  | Surface | 77 | 75 | 75 | 75 | 75 | 73 | 75 |

*[1] High-cis-polybutadiene rubber 150 L (manufactured by UBE INDUSTRIES, LTD.) having the Mooney's viscosity of 40 to 46 (Co-containing catalysts).
*[2] CB23 (Bayer) having the Mooney's viscosity of 50 to 55 (Nd-containing catalysts).
*[3] NOCRAC NS-7 (OUCHI SHINKO CHEMICAL INDUSTRIAL), 2,5-di-t-butylhydroquinone.
*[4] Dicumyl peroxide In Example 4 and 5, other high-cis-polybutadiene rubber was blended with high-cis-polybutadiene rubber having the Mooney's viscosity of 60 to 65 synthesized by the use of nickel-containing catalysts in a quantity up to 50%. The golf balls according to Example 4 and 5 are by no means inferior to the golf ball according to Example 3. In Comparative Example 6 to 9, other high-cis-polybutadiene rubber was used in a quantity of 50 % or more. The coefficient of restitution and the workability in the mixing process become deteriorated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-piece solid golf ball having a central hardness (JIS-C hardness) of 60 to 75, a hardness at a position 10 mm from the center of 72 to 80 and a surface hardness of 70 to 85, whereby the central hardness is minimum, and the difference between the maximum hardness and the minimum hardness is 15 or less, said golf ball being obtained by vulcanizing and molding a rubber composition comprising
   (a) 100 parts by weight of polybutadiene rubber, mainly comprising high-cis-polybutadiene rubber containing the cis-1,4-structure in a quantity of at least 96% and having a Mooney viscosity of 48 and 85 and synthesized by the use of a nickel-containing catalyst;
   (b) 0.1 to 2.0 parts by weight of 2,5-di-t-butylhydroquinone as a vulcanization stabilizer;
   (c) 10 to 50 parts by weight of unsaturated carboxylic acids and/or salts thereof; and
   (d) 0.5 to 5 parts by weight of a free radical initiator.

2. The one-piece golf ball according to claim 1 wherein said butadiene rubber has a Mooney viscosity of 55 to 65.

3. The one-piece golf ball according to claim 1 wherein an amount of said vulcanization stabilizer is 0.15 to 0.5 parts by weight.

4. The one-piece golf ball according to claim 1 wherein said unsaturated carboxylic acid is methacrylic acid.

5. The one-piece golf ball according to claim 1 wherein said free radical initiator is dicumyl peroxide or 1,1-bis(t-butylperoxy)-3,3,5-trimethylcyclohexane.

6. The one-piece golf ball according to claim 1 wherein said central hardness is 64 to 72.

7. The one-piece golf ball according to claim 1 wherein said surface hardness is 72 to 80.

* * * * *

UNITED STATES PATENT AND TRADEMARK OFFICE
CERTIFICATE OF CORRECTION

PATENT NO. : 4,974,852
DATED : December 4, 1990
INVENTOR(S) : Hiraoka et al

It is certified that error appears in the above-identified patent and that said Letters Patent is hereby corrected as shown below:

ON TITLE PAGE: "(73) Assignee:", please change

"Sumitomo Rubber Industries, Ltd., Kyogo, Japan" to

--Sumitomo Rubber Industries, Ltd., Hyogo, Japan--

Signed and Sealed this

Seventh Day of July, 1992

Attest:

DOUGLAS B. COMER

*Attesting Officer*     Acting Commissioner of Patents and Trademarks